United States Patent
Burlingham et al.

(10) Patent No.: US 9,243,929 B2
(45) Date of Patent: Jan. 26, 2016

(54) FUEL PURCHASE PLANNING ALONG A ROUTE

(71) Applicant: International Business Machines Corporation, Armonk, NY (US)

(72) Inventors: Jennifer L. Burlingham, Holly Springs, NC (US); Gary D. Cudak, Creedmoor, NC (US); Christopher J. Hardee, Raleigh, NC (US); Christine M. Stamm-Nettleship, Wake Forest, NC (US); LaLecha J. Watkins, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 113 days.

(21) Appl. No.: 14/096,090

(22) Filed: Dec. 4, 2013

(65) Prior Publication Data

US 2015/0154638 A1 Jun. 4, 2015

Related U.S. Application Data

(63) Continuation of application No. 14/095,329, filed on Dec. 3, 2013.

(51) Int. Cl.
*G01C 21/36* (2006.01)
*G01C 21/34* (2006.01)
*G06Q 30/02* (2012.01)

(52) U.S. Cl.
CPC ........ *G01C 21/3697* (2013.01); *G01C 21/3469* (2013.01); *G01C 21/3682* (2013.01); *G06Q 30/0259* (2013.01)

(58) Field of Classification Search
CPC ........... G01C 21/3697; G01C 21/3682; G01C 21/3469; G06Q 30/0259
See application file for complete search history.

(56) References Cited

U.S. PATENT DOCUMENTS

| | | | |
|---|---|---|---|
| 6,078,850 A | 6/2000 | Kane et al. | |
| 7,013,205 B1 | 3/2006 | Hafner et al. | |
| 8,116,972 B2 * | 2/2012 | Klampfl et al. | 701/123 |
| 2007/0290039 A1 | 12/2007 | Pfleging et al. | |
| 2011/0288765 A1 * | 11/2011 | Conway | 701/201 |
| 2013/0117054 A1 | 5/2013 | Cooper et al. | |

FOREIGN PATENT DOCUMENTS

EP 0940311 B1 8/2004

* cited by examiner

*Primary Examiner* — John Q Nguyen
*Assistant Examiner* — Michael Kerrigan
(74) *Attorney, Agent, or Firm* — Jeffrey L. Streets

(57) ABSTRACT

A method is provided for recommending a fuel purchase plan along a route to a selected destination. The method includes obtaining a fuel tank size, amount of fuel in the tank, and a fuel efficiency for an automobile. The method further includes accepting user entry of a destination for traveling in the automobile, automatically identifying a current location and determining a route to the destination. For each of a plurality of refueling stations along the route, the method acquires a location of the refueling station and a current fuel price being offered at the refueling station. The method then provides output recommending one or more refueling stations at which to stop and a quantity of fuel to purchase at each of the one or more refueling stations in order to reach the destination without running out of fuel and minimizing the price of fuel purchased.

14 Claims, 5 Drawing Sheets

FUEL PURCHASE PLANNING ALONG A ROUTE

CROSS-REFERENCE TO RELATED APPLICATIONS

This application is a continuation of U.S. patent application Ser. No. 14/095,329 filed on Dec. 3, 2013, which application is incorporated by reference herein.

BACKGROUND

1. Field of the Invention

The present invention relates to travel planning and navigation.

2. Background of the Related Art

As automotive fuel prices have risen, the cost of traveling by automobile has also risen to become a greater proportion of a person's monthly expenses. Accordingly, there has been an increase in various efforts to purchase fuel at a low prices. Radio stations may announce low fuel prices reported by their listeners and websites may describe fuel prices at various locations around the country. Furthermore, online map programs or mobile navigation systems make it possible to quickly determine the distance from one address to another, while a GPS-enable mobile device can track its current location. Even the current design of automobiles reflects an increased focus on fuel efficiency, as many models now include systems that will calculate an estimated fuel efficiency of the automobile under actual driving conditions.

BRIEF SUMMARY

One embodiment of the present invention provides a method comprising: obtaining a fuel tank size, amount of fuel in the tank, and an estimated fuel efficiency for an automobile, and accepting user entry of a destination for traveling in the automobile. The method then automatically identifies a current location and determines a route to the destination. For each of a plurality of refueling stations along the route, the method acquires a location of the refueling station and a current fuel price being offered at the refueling station, and then provides output recommending one or more refueling stations at which to stop and a quantity of fuel to purchase at each of the one or more refueling stations in order to reach the destination without running out of fuel and minimizing the price of fuel purchased.

DETAILED DESCRIPTION

Figure 1:
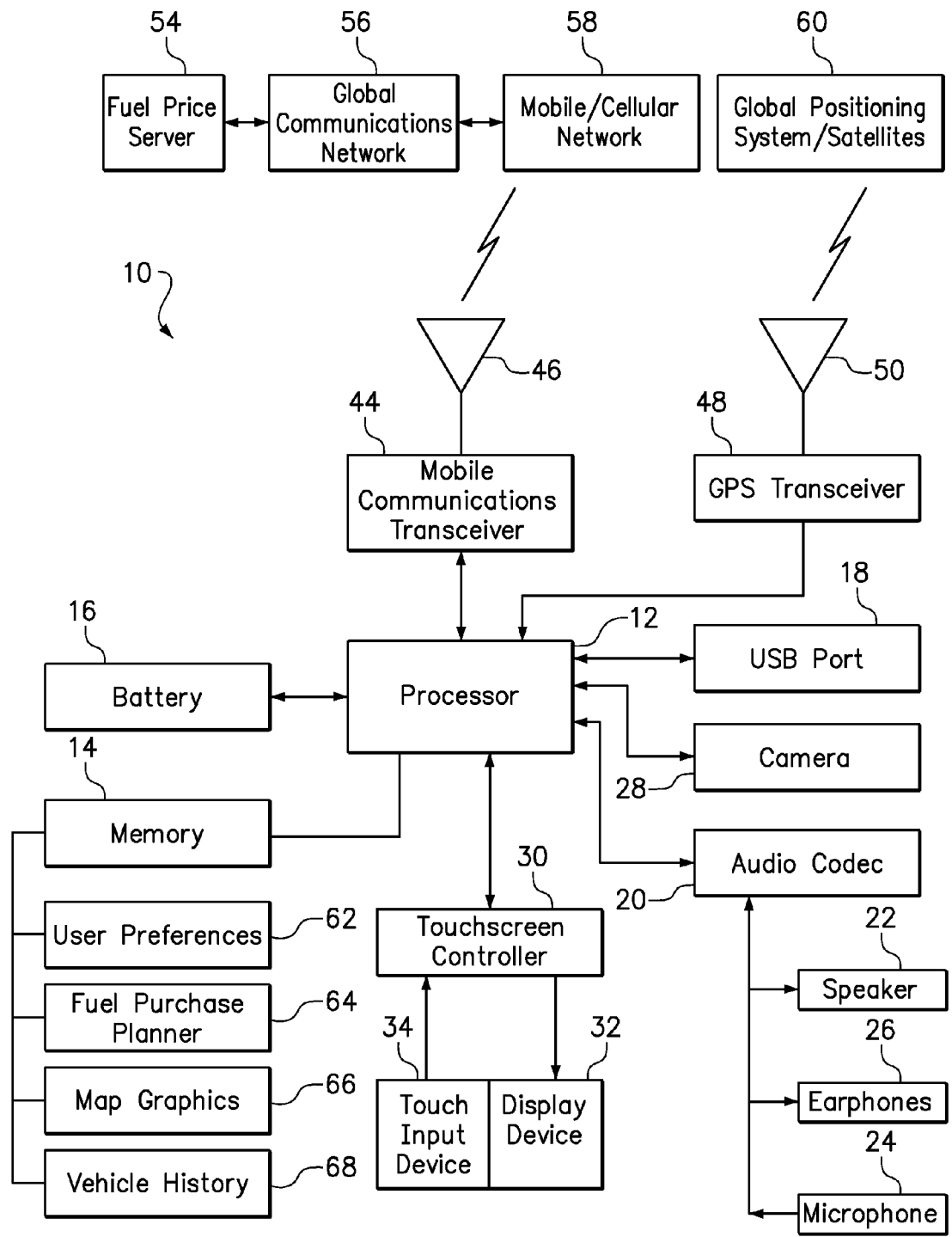
FIG. 1 is a block diagram of a mobile device for fuel purchase planning.

One embodiment of the present invention provides a method comprising: obtaining a fuel tank size, amount of fuel in the tank, and an estimated fuel efficiency for an automobile, and accepting user entry of a destination for traveling in the automobile. The method then automatically identifies a current location and determines a route to the destination. For each of a plurality of refueling stations along the route, the method acquires a location of the refueling station and a current fuel price being offered at the refueling station, and then provides output recommending one or more refueling stations at which to stop and a quantity of fuel to purchase at each of the one or more refueling stations in order to reach the destination without running out of fuel and minimizing the price of fuel purchased.

The method is preferably performed by a mobile device that accompanies the user in the automobile while traveling to the destination. Non-limiting examples of the mobile device may include handheld devices, such as a navigation system or a mobile phone, or devices integrated into the automobile, such as a touchscreen computer. The method may obtain the fuel tank size, amount of fuel in the tank, and an estimated fuel efficiency for the automobile by either manual user entry, communication with an integrated automobile computer, or by implementing the method to be performed by an integrated automobile computer. In either instance, the fuel tank size and estimated fuel efficiency might be stored in memory by the automobile manufacture, and the amount of fuel in the tank is measured by a fuel tank sensor and communicated to the mobile device. Fuel efficiency may also be tracked over one or more tanks of fuel in order to provide a fuel efficiency measurement consistent with recent history or experience instead of a manufacturer's estimate.

User entry of a destination may include entering an address into a map program on the mobile device, selecting from a list of previously entered addresses or contacts, or merely finding and selecting the destination on a map display. The mobile device is preferably GPS-enabled so as to automatically identify a current location of the mobile device. Since the map program then has access to the current location and destination, the map program is able to determine a route to the destination. Preferably, the mobile device will include a display screen and will display a route to the recommended refueling stations.

For each of a plurality of refueling stations along the route, the method acquires a location of the refueling station and a current fuel price being offered at the refueling station. This information is obtained from a third party service provider, preferably providing access to a database of refueling stations and the continuously or periodically updated fuel prices being offered at those refueling stations.

The method then provides output recommending one or more refueling stations at which to stop and a quantity of fuel to purchase at each of the one or more refueling stations in order to reach the destination without running out of fuel and minimizing the price of fuel purchased. For example, a mobile device may include a display screen that shows the map with icons illustrating the locations of the recommended one or more refueling stations. Without limitation, the recommended quantity of fuel to purchase may be identified by the total cost, quantity of fuel, or percentage of the tank volume.

In a further embodiment, the method accepts user entry of a target duration for traveling from the current location to the destination, and determining a number of refueling station stops that may be accommodated without exceeding the target duration. In order to make such a determination, the method may assume the automobile will travel at posted speed limits or the method may access a local traffic database that provides access to currently measured speeds on major roadways. Using either measure of expected speed in each section of the route, the method may optionally determine a total travel time and subtracting the total travel time from the target duration to determine the amount of time available for stopping at the one or more refueling stations. A number of refueling station stops that may be accommodated may then be determined by dividing the amount of time available for stopping by a user-entered time delay per refueling station. The user-entered time delay per refueling station may be entered into a user preferences screen as part of the system setup. Alternatively, the mobile device may measure the actual time delay at each refueling station stop over time and accumulate a history or some type of average delay.

A still further embodiment of the method accepts user entry of an acceptable savings per unit of time delay. This value allows the method to include off-route refueling stations in the recommended refueling stations so long as the amount of money saved by purchasing fuel at the off-route refueling station exceeds the value of the delay in reaching the off-route refueling station. Specifically, the value of the delay is determined by the product of the time delay reaching the off-route refueling station and the user-entered acceptable savings per unit of time delay. For example, if a refueling station was two miles off-route and sold fuel at 20 cents per gallon less than other refueling stations, and the automobile needed ten gallons of fuel, then the user would expect to save two dollars at an additional delay of four minutes (where the speed limit is 60 miles per hour). If this 50 cents per minute savings is greater than the user-entered value of acceptable savings per unit of time delay, then the method would recommend the refueling station.

In another embodiment, the method accepts user entry of a minimum acceptable fuel purchase, wherein the recommended quantity of fuel to purchase at each of the one or more refueling stations is not less than the user-entered minimum acceptable fuel purchase. The minimum acceptable fuel purchase is an optional user preference that has the effect of preventing the recommendation from including an excessive number of refueling stations. Alternatively, the user preferences may allow entry of a maximum number of refueling stations along the route to the destination.

In yet another embodiment, the method may include calculating a net change in elevation between the current location and the destination and adjust the fuel efficiency to account for the net change in elevation. The amount of such an adjustment may be empirically determined and stored in memory, possibly as a function of the vehicle weight or additional features such as a trailer.

An additional embodiment of the method accepts user entry of a minimum refueling station quality, identifies a refueling station quality rating for each refueling station, and recommends only refueling stations having at least the minimum refueling station quality. A refueling station quality standard should be described, such as numerical rating from 1 to 5 with a "1" being the best and a "5" being the worst. The ratings may be based on customer overall experience or fuel quality. Such ratings are preferably made available along with the third party database of refueling stations and current prices. The method uses the quality rating as a filter to reduce the number of refueling stations that may be considered in determining which refueling stations to include in a recommended fuel plan.

Another embodiment of the method further includes determining and displaying an estimated total cost of fuel to reach the destination by purchasing the recommended quantity of fuel at the recommended refueling stations. In a further option, the method may determine and display an estimated total cost of fuel to reach the destination by purchasing fuel at an average price of all refueling stations along the route. In other words, the method may display the total cost of fuel using the recommended refueling stations compared with the total cost of fuel using random refueling stations. Such information may be motivating to the user to follow the recommended fuel plan.

Embodiments of the method may further include accepting user entry of a preference whether or not to arrive at the destination with a given amount of fuel remaining in the tank. Based upon this user preference, the recommended fuel plan may plan for the fuel tank to be nearly empty upon reaching the destination or to take a longer term planning horizon and let the recommended fuel purchase quantity vary as a function of the price. In other words, if the last necessary refueling station stop on the route to the destination has a good price, then it may be desirable to fill up and leave several gallons in the tank to the benefit of traveling to a future destination.

Still further, embodiments of the method may further include accepting user entry of an estimated time delay per refueling station. Some users may hustle to fill up their tanks quickly and others may routinely purchase drinks, make phone calls or take a dog for a walk. Accordingly, the individual user may enter their preference for how much time should be allotted to each stop at a refueling station.

In another optional embodiment, the method may dynamically adjusting the recommended one or more refueling stations or recommended quantity of fuel to purchase at each refueling station in response to an updated location of the vehicle, an updated duration, an alternative fuel purchase, or a missed turn. For example, an update location may result from driving a speed other than the speed used in the original recommendation, such that there is more or less time for stops. Another reason for updating the location is the possibility that the user made a wrong turn, passed through a construction zone, or stopped to change a tire. These and other unforeseen events can be determined by the GPS location detection system and an internal clock.

A process for determining the recommended refueling stations and quantities to purchase may include any known decision algorithm. For example, the method may calculate every possible combination of refueling stations and fuel quantities that are consistent with the destination, user preferences and the available refueling station and pricing data, then select the best combination, such as the combination that results in the lowest total price. Alternatively, the method may seek to arrive at a recommendation that includes buying the highest possible amount of fuel at the cheapest station, then the second most amount at the second cheapest, and so on until the vehicle has sufficient fuel to reach the destination. In a further specific process for determining the recommended refueling stations and quantities to purchase may include the following steps:

(1) Obtain the total distance to travel (TDT).
(2) Obtain an expected fuel efficiency (FE).
(3) Obtain user preferences, such as maximum number of stops (MS) and time per stop (TPS) and desired arrival time or duration (DAT).
(4) Obtain total efficiency for a stop (ES) based on cost per gallon and how far off the exit the station is located.
(5) Rank all stops (SP) along a route by total efficiency (ES) and include TPS and DAT relative to the time constraints.
(6) Initially divide TDT by MS to segment the route and determine the highest ranked (i.e., lowest priced) stops (BSPn) for each segment. If a segment is long enough, there may be multiple stops, BSP1, BSP2, etc. within the segment.

(7) For the highest ranked (BSPn) in each segment, provide the estimated gallons or dollar amount (FUEL) to ensure reaching the next BSPn. However, if the segment is longer than the vehicle can travel on a full tank, then obtain enough BSPs to cover the distance.

Another embodiment of the present invention provides a computer program product including computer readable program code embodied on a computer readable storage medium. The computer program product comprises computer readable program code for obtaining a fuel tank size, amount of fuel in the tank, and an estimated fuel efficiency for an automobile; computer readable program code for accepting user entry of a destination for traveling in the automobile; computer readable program code for automatically identifying a current location and determining a route to the destination; computer readable program code for acquiring, for each of a plurality of refueling stations along the route, a location of the refueling station and a current fuel price being offered at the refueling station; and computer readable program code for providing output recommending one or more refueling stations at which to stop and a quantity of fuel to purchase at each of the one or more refueling stations in order to reach the destination without running out of fuel and minimizing the price of fuel purchased. Still further, the user may alter the duration to reflect a change in their plans.

The foregoing computer program products may further include computer readable program code for implementing or initiating any one or more aspects of the methods described herein. Accordingly, a separate description of the methods will not be duplicated in the context of a computer program product.

FIG. 1 is a block diagram of a mobile device 10, such as a smart phone, capable of fuel purchase planning in accordance with one embodiment of the invention. The mobile device 10 may include a processor 12, memory 14, a battery 16, a universal serial bus (USB) port 18, a camera 28, and an audio codec 20 coupled to a speaker 22, a microphone 24, and an earphone jack 26. The device 10 may further include a touchscreen controller 30 which provides a graphical output to the display device 32 and an input from a touch input device 34. Collectively, the display device 32 and touch input device 34 may be referred to as a touchscreen.

The device 10 may also include a mobile communication transceiver 44 and corresponding antenna 46 allowing the device to communicate over a mobile/cellular network 58, and a global positioning system (GPS) transceiver 48 and corresponding antenna 50 allowing the device to obtain signals from a global positioning system or satellites 60. In a non-limiting example, the mobile/cellular network 58 may be connected to a global communications network 56, such as the Internet, providing access to a fuel price server 54 for the purpose of acquiring the location of refueling stations along the a selected route and a current fuel price being offered at each of the refueling stations. When the mobile device 10 has memory 14 with sufficient capacity, it is preferable to include additional data storage and logic functions within the mobile device itself. As shown, the memory 14 stores user preferences 62, fuel purchase planner 64, map graphics 66, and vehicle history 68.

Figure 2:
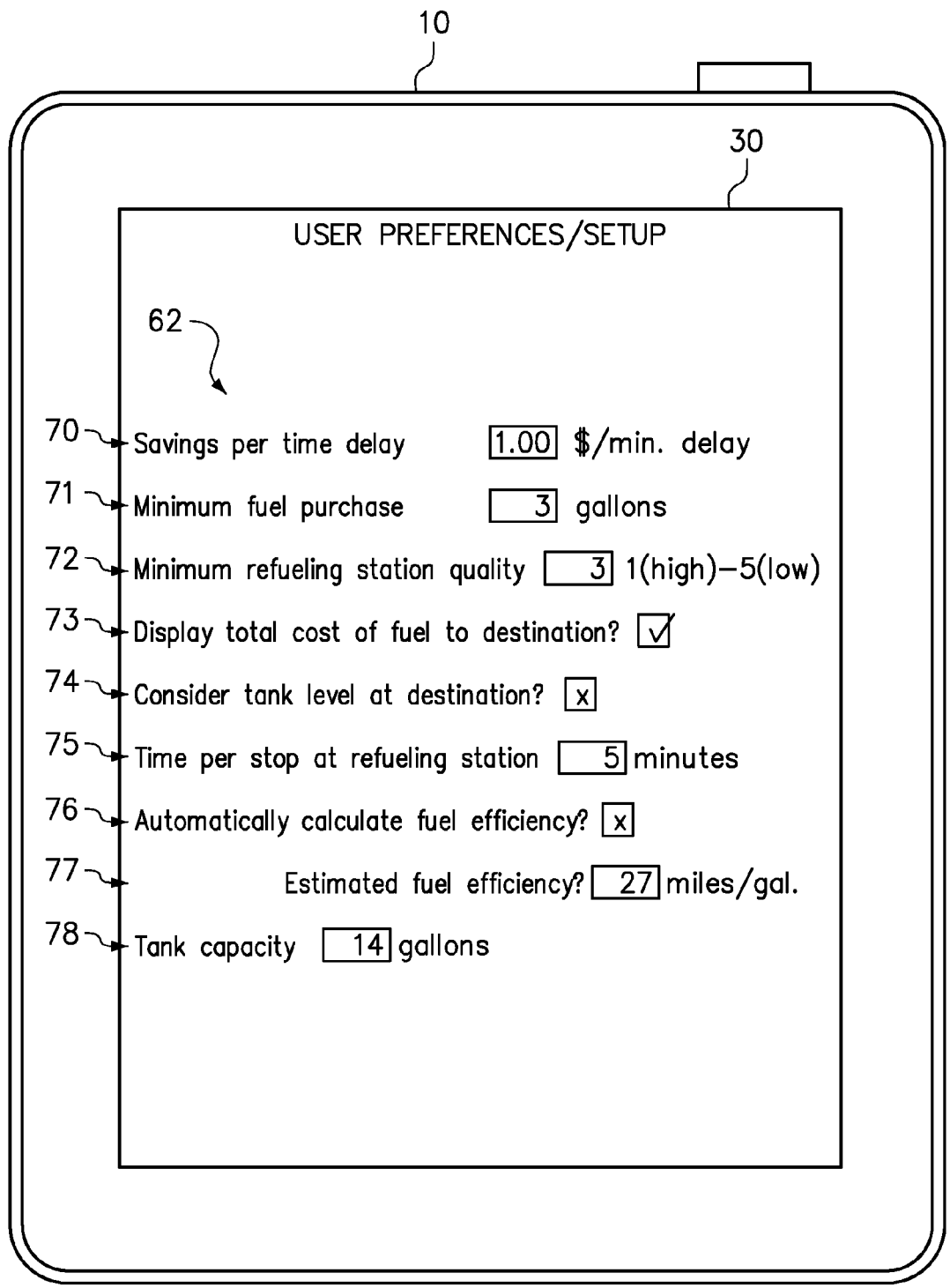
FIG. 2 is a screenshot of a mobile device displaying various user preferences and system setup options.

FIG. 2 is a screenshot of the display device or screen 30 of the mobile device 10 displaying various user preferences and system setup options 62. Other user preferences and system setup options may be used as well. This example includes "savings per time delay" 70, which the user has set at 1.00 $/minute of delay. This value may be used to determine how to balance the tradeoff between fuel price and refueling station distance off-route. The user has also set a "minimum fuel purchase" 71 at 3 gallons, such that the fuel plan will not recommend fuel purchases of less than 3 gallons. This user has further entered a "minimum refueling station quality" 72 at level 3 on a scale from 1 (high quality) to 5 (low quality), such that the fuel purchase planner will not consider refueling stations having quality ratings of 4 or 5. The option of "display total cost of fuel to destination" 73 has been selected (check-mark) so that this information will be displayed during each trip. The option of "consider tank level at destination" 74 has been de-selected ("X") so that the fuel purchase planner will not attempt to leave the fuel tank empty, or at any other specific fuel tank level, upon reaching the destination. The user has entered a "time per stop at refueling station" 75 of 5 minutes, and a "tank capacity" 78 of 14 gallons. Still further, the user has de-selected the option of "automatically calculate fuel efficient" 76, and has opted to manually enter an "estimated fuel efficiency" 77 of 27 miles per gallon.

Figure 3:
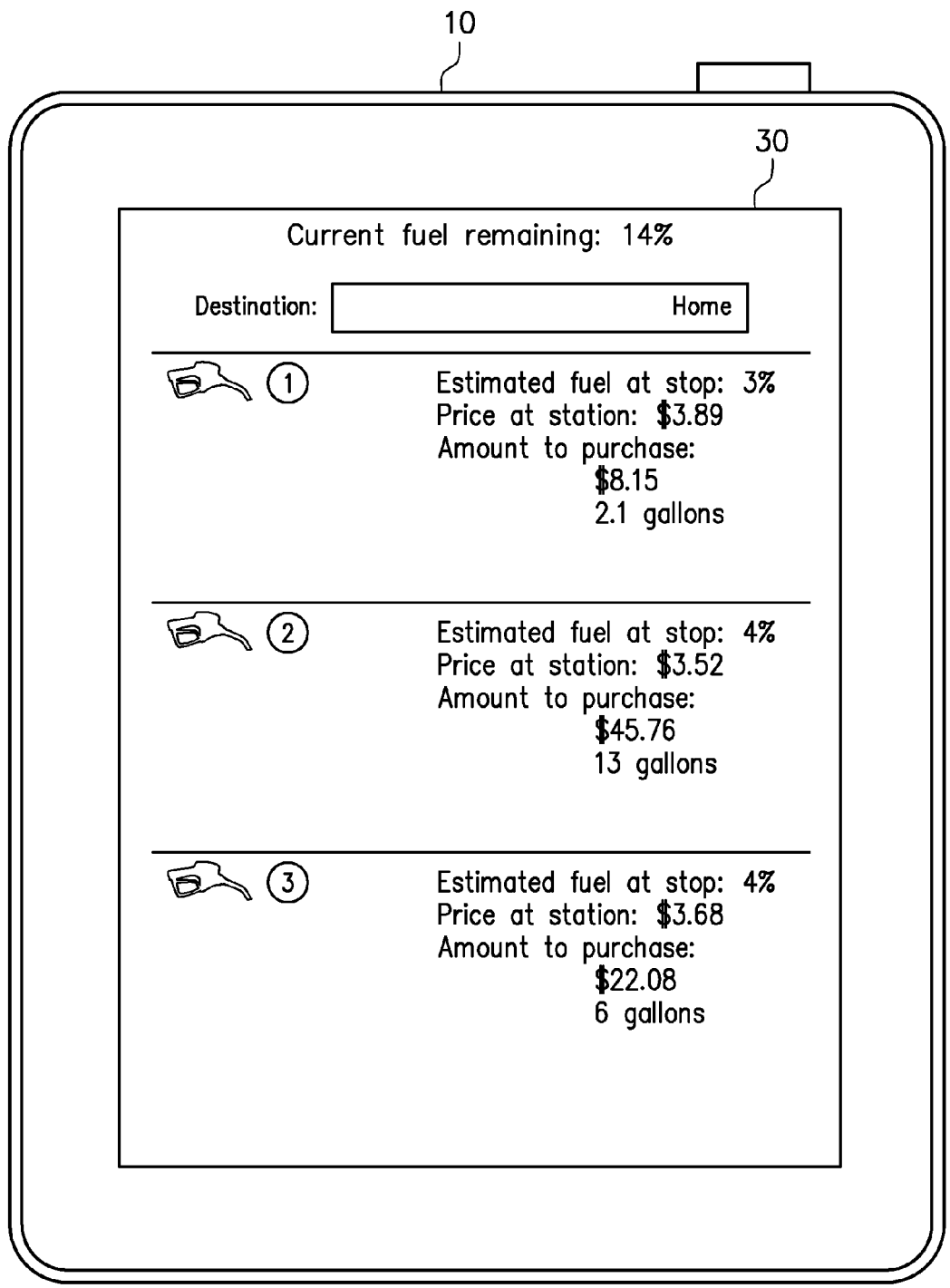
FIG. 3 is a screenshot of the mobile device displaying a recommended fuel purchase plan to reach a stated destination.

FIG. 3 is a screenshot of the display device or screen 30 of the mobile device 10 displaying a recommended fuel purchase plan to reach a stated destination. The fuel purchase plan shows that the current fuel remaining (i.e., fuel tank level) is 14% and that the user has used a list of previously identified destinations to select "Home" as the current destination. This fuel purchase plan recommends that the user stop at three refueling stations along the route to Home, and details the estimated fuel tank level upon arrival at the refueling station, the current fuel price at the refueling station, and the recommended amount of fuel to purchase at the refueling station (both in dollar amount and fuel quantity).

By planning fuel purchases along the entire route to the destination and minimizing the price paid for fuel for over the entire route, the fuel purchase plan has an advantage over simply buying the cheapest fuel you can find. Rather, the fuel purchase plan will attempt to leave the fuel tank at a low level at the point of arriving at a refueling station having a low or perhaps lowest fuel price. For example, the fuel purchase plan in FIG. 3 recommends that the user stop at a first refueling station and purchase only 2.1 gallons, even though the fuel tank capacity is 14 gallons and the initial fuel level was as low as 14%. The reason for the small purchase at the first refueling station is to be prepared to maximize the benefit from the even lower priced fuel ($3.52 per gallon) at the second recommended refueling station. Accordingly, the recommendation suggests the user purchase 13 gallons of fuel (i.e., fill the tank) at the second refueling station. A third refueling station is recommended for a purchase of 6 gallons of fuel in order to complete the route to the destination. Consistent with the user preferences in FIG. 2, none of the three recommended refueling stations will have a quality rating less than 3.

Figure 4:
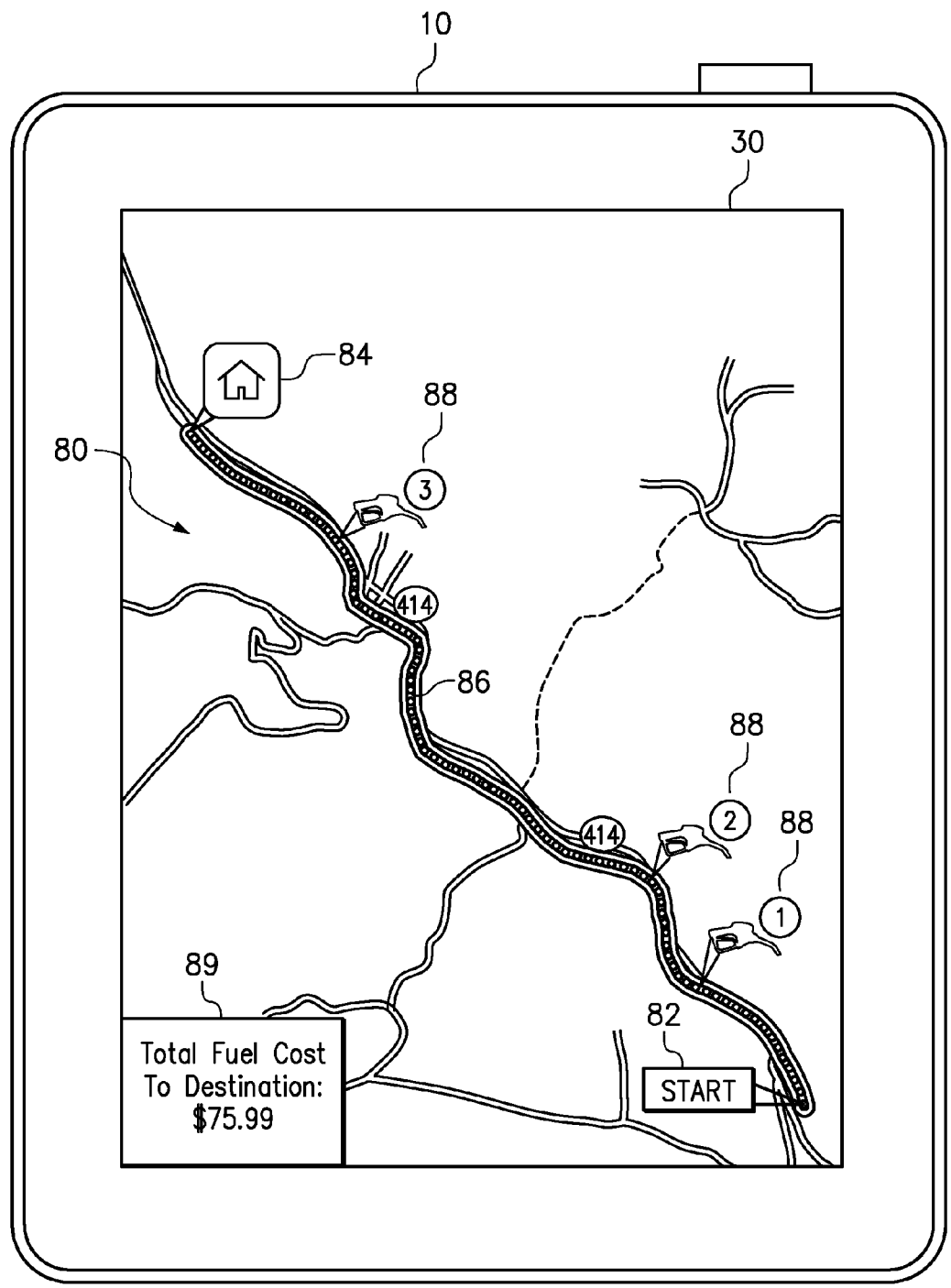
FIG. 4 is a screenshot of the mobile device displaying a map that highlights the start, destination, route, and the location of refueling stations that are part of the recommended fuel purchase plan.

FIG. 4 is a screenshot of the display device or screen 30 of the mobile device 10 displaying a map 80 that highlights the start 82, destination 84, route 86, and the location of refueling stations 88 that are part of the recommended fuel purchase plan. Consistent with the user preferences in FIG. 2, the map display 80 includes the total fuel cost to destination 89 of $75.99.

Figure 5:
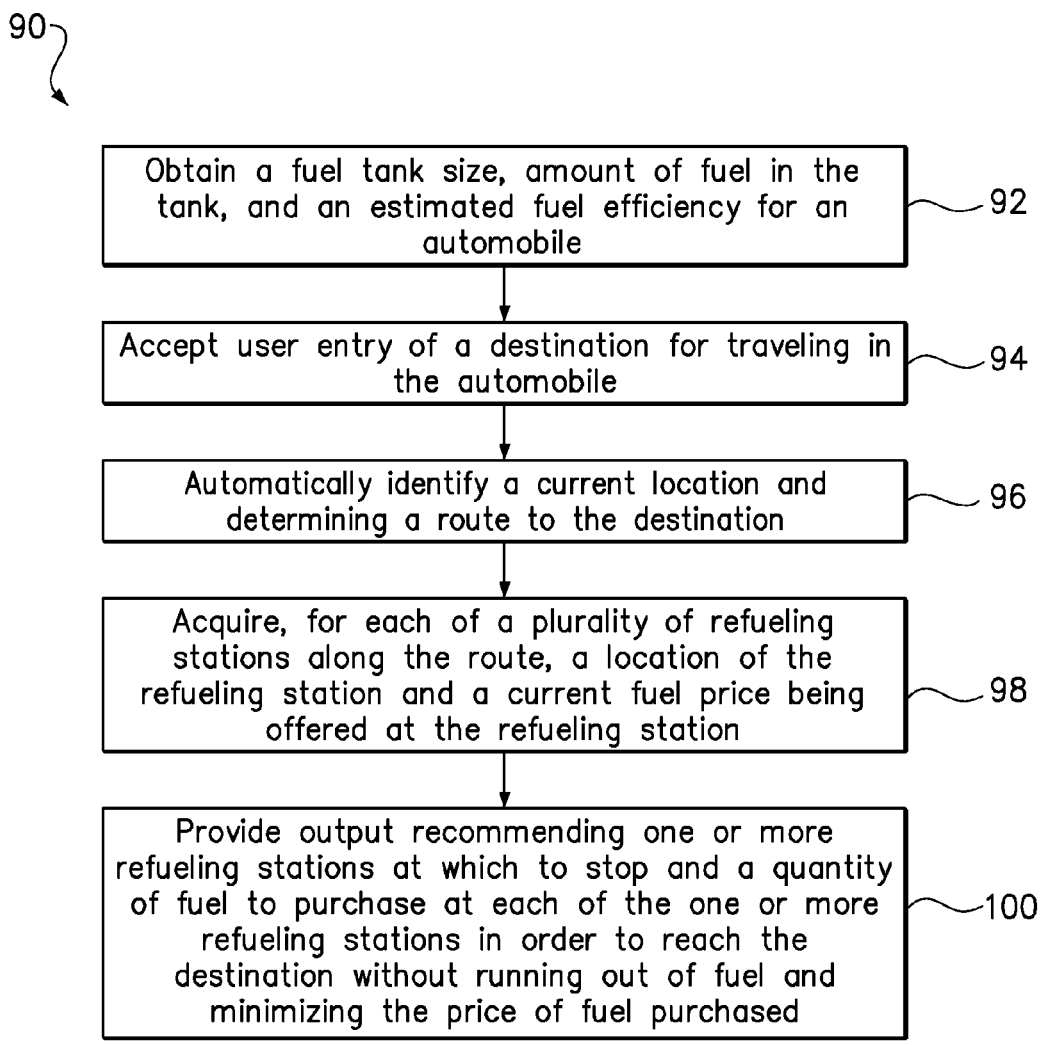
FIG. 5 is a flowchart of a method in accordance with one embodiment of the present invention.

FIG. 5 is a flowchart of a method 90 in accordance with one embodiment of the present invention. In step 92, the method obtains a fuel tank size, amount of fuel in the tank, and an estimated fuel efficiency for an automobile. In step 94, the method accepts user entry of a destination for traveling in the automobile. A current location is automatically identified and a route to the destination is determined in step 96. Step 98 acquires, for each of a plurality of refueling stations along the route meeting the user's selected quality rating, a location of the refueling station and a current fuel price being offered at the refueling station. Then, in step 100, the method provides output recommending one or more refueling stations at which to stop and a quantity of fuel to purchase at each of the one or more refueling stations in order to reach the destination without running out of fuel and minimizing the price of fuel purchased.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method executed by a mobile device including a GPS-enabled navigation program, comprising:
   obtaining a fuel tank size, amount of fuel in the tank, and a fuel efficiency for an automobile;
   accepting user entry of a destination for traveling in the automobile;
   automatically identifying a current location and determining a route to the destination;
   acquiring, for each of a plurality of refueling stations along the route, a location of the refueling station and a current fuel price being offered at the refueling station;
   providing output recommending one or more refueling stations at which to stop and a quantity of fuel to purchase at each of the one or more refueling stations in order to reach the destination without running out of fuel and minimizing the price of fuel purchased; and
   displaying a route to the recommended refueling stations.

2. The method of claim 1, further comprising:
   accepting user entry of a target duration for traveling from the current location to the destination; and
   determining a number of refueling station stops that may be accommodated without exceeding the target duration.

3. The method of claim 2, further comprising:
   accepting user entry of an acceptable savings per unit of time delay, wherein the recommended refueling stations may include an off-route refueling station so long as the amount of money saved by purchasing fuel at the off-route refueling station exceeds the value of the delay in reaching the off-route refueling station, wherein the value of the delay is determined by the product of the time delay reaching the off-route refueling station and the user-entered acceptable savings per unit of time delay.

4. The method of claim 2, further comprising:
   determining a total travel time based on the speed limits for each section of the route;
   subtracting the total travel time from the target duration to determine the amount of time available for stopping at the one or more refueling stations, wherein determining a number of refueling station stops that may be accommodated includes dividing the amount of time available for stopping by a user-entered time delay per refueling station.

5. The method of claim 1, further comprising:
   accepting user entry of a minimum acceptable fuel purchase, wherein the recommended quantity of fuel to purchase at each of the one or more refueling stations is not less than the user-entered minimum acceptable fuel purchase.

6. The method of claim 1, further comprising:
   calculating a net change in elevation between the current location and the destination; and
   adjusting the fuel efficiency to account for the net change in elevation.

7. The method of claim 1, further comprising:
   accepting user entry of a minimum refueling station quality;
   identifying a refueling station quality rating for each refueling station; and
   recommending only refueling stations having at least the minimum refueling station quality.

8. The method of claim 1, further comprising:
   determining and displaying an estimated total cost of fuel to reach the destination by purchasing the recommended quantity of fuel at the recommended refueling stations.

9. The method of claim 8, further comprising:
   determining and displaying an estimated total cost of fuel to reach the destination by purchasing fuel at an average price of all refueling stations along the route.

10. The method of claim 1, wherein the recommended quantity of fuel to purchase is identified by the total cost, volume of fuel, or percentage of the tank volume.

11. The method of claim 1, wherein the estimated fuel efficiency is based on historical measurements for the automobile.

12. The method of claim 1, further comprising:
    accepting user entry of a preference whether or not to arrive at the destination with a given amount of fuel remaining in the tank.

13. The method of claim 1, further comprising:
    accepting user entry of an estimated time delay per refueling station.

14. The method of claim 1, further comprising:
    dynamically adjusting the recommended one or more refueling stations or recommended quantity of fuel to purchase at each refueling station in response to an updated location of the vehicle, an updated duration, an alternative fuel purchase, or a missed turn.

* * * * *